(12) United States Patent
Kim et al.

(10) Patent No.: US 8,204,549 B2
(45) Date of Patent: Jun. 19, 2012

(54) PORTABLE TERMINAL

(75) Inventors: Young-Joong Kim, Seoul (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 1176 days.

(21) Appl. No.: 12/018,077

(22) Filed: Jan. 22, 2008

(65) Prior Publication Data
US 2008/0311960 A1   Dec. 18, 2008

(30) Foreign Application Priority Data

Jun. 13, 2007 (KR) .................. 10-2007-0057879
Jul. 25, 2007 (KR) .................. 10-2007-0074777

(51) Int. Cl.
*H04M 1/00* (2006.01)
*H04R 25/00* (2006.01)

(52) U.S. Cl. ............. 455/569.2; 455/550.1; 455/575.2; 381/370

(58) Field of Classification Search .......... 455/550.1, 455/569.1, 575.2, 575.6; 381/370; 379/430
See application file for complete search history.

(56) References Cited

U.S. PATENT DOCUMENTS

| 6,230,029 B1* | 5/2001 | Hahn et al. ............. 455/575.2 |
| 2002/0003874 A1* | 1/2002 | Peiker .................... 379/419 |
| 2003/0148798 A1* | 8/2003 | Asakura .................. 455/573 |
| 2004/0209659 A1* | 10/2004 | Sun et al. ............... 455/575.4 |
| 2004/0240870 A1* | 12/2004 | Stiehler .................. 396/103 |
| 2005/0136949 A1 | 6/2005 | Barnes, Jr. |
| 2007/0025581 A1* | 2/2007 | Bradford et al. ......... 381/388 |
| 2007/0037551 A1* | 2/2007 | Piekarz .................. 455/406 |
| 2007/0042821 A1* | 2/2007 | Lee et al. .............. 455/575.6 |
| 2007/0137271 A1* | 6/2007 | Katagiri et al. .......... 70/459 |

* cited by examiner

*Primary Examiner* — George Eng
*Assistant Examiner* — Bryan Pitt
(74) *Attorney, Agent, or Firm* — Birch, Stewart, Kolasch & Birch, LLP

(57) ABSTRACT

A portable terminal including a terminal body having an earpiece mounting portion, and an earpiece detachably mounted at the earpiece mounting portion. The earpiece includes an earpiece body configured to communicate with the terminal body, and a speaker portion configured to output sound transmitted from the earpiece body, the speaker portion having a controllable length so as to reduce a thickness of the earpiece when the earpiece is detachably mounted at the earpiece mounting portion.

26 Claims, 15 Drawing Sheets

PORTABLE TERMINAL

CROSS-REFERENCE TO RELATED APPLICATIONS

This application claims the benefit of priority of Korean Application No. 10-2007-0057879, filed Jun. 13, 2007, and Korean Application No. 10-2007-0074777, filed Jul. 25, 2007, both of which are herein expressly incorporated by reference in their entireties.

BACKGROUND OF THE INVENTION

1. Field of the Invention

The present invention relates generally to a portable terminal, and more particularly, a portable terminal having a detachable earpiece.

2. Description of Related Art

A portable terminal is a portable device having one or more functions among a voice calling-function, a video calling function, an information inputting/outputting function, and a data storing function. In addition, the portable terminal may have other more complicated functions, such as a function for capturing a still image or a moving image, a function for reproducing a music file or a moving image, a game function, and a function for receiving broadcasting data. For example, the portable terminal may be implemented as a multimedia player.

Various modifications to hardware or software aspects of the related art portable terminals so as to more easily implement one or more of the above complicated functions. For instance, a user's interface for allowing a user to easily and conveniently search or select a function is provided. The portable terminals have changed over time to accommodate user's preferences for these functions. At the same time, the portable terminals are regarded as a personal belonging and are designed to reflect a user's personality.

Recently, near-distance wireless communication modules have been provided in portable terminals so a user, by using an earpiece, can conveniently perform a communication with another party without holding the portable terminal. However, these earpieces are separate from the portable terminal, and as a result, they are easily lost.

BRIEF SUMMARY OF THE INVENTION

Therefore, an object of the present invention is to provide a portable terminal capable of enhancing a user's convenience by detachably mounting an earpiece that can be wirelessly communicated with a terminal body, and having a slim thickness by reducing a space where the earpiece is mounted.

To achieve these and other advantages and in accordance with the purpose of the present disclosure, as embodied and broadly described herein, there is provided a portable terminal including a terminal body having an earpiece mounting portion, and an earpiece detachably mounted at the earpiece mounting portion. The earpiece includes an earpiece body configured to communicate with the terminal body, and a speaker portion configured to output sound transmitted from the earpiece body, the speaker portion having a controllable length so as to reduce a thickness of the earpiece when the earpiece is detachably mounted at the earpiece mounting portion.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of tire invention, in the drawings.

DETAILED DESCRIPTION OF THE INVENTION

Reference will now be made in detail to the exemplary embodiments of the present disclosure, examples of which are illustrated in the accompanying drawings. Hereinafter, a portable terminal according to the present invention will be explained in more detail. Wherever possible, the same reference numbers will be used throughout the drawings to refer to the same or like parts.

Figure 1:
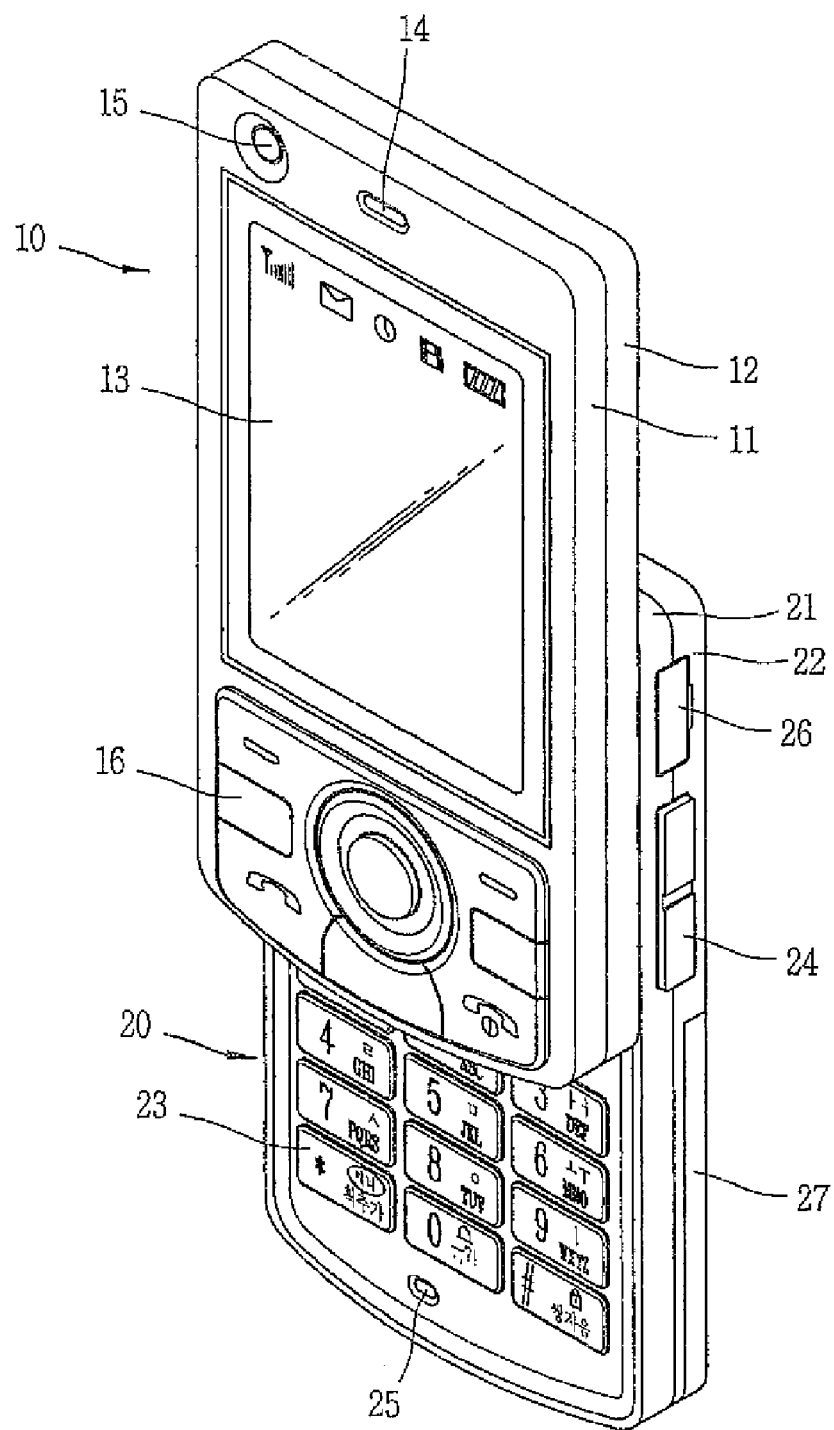
FIG. 1 is a front perspective view showing a portable terminal according to an exemplary embodiment of the present invention.

As shown in FIG. 1, the portable terminal includes a first body 10, and a second body slidable with respect to the first body 10 in at least one direction. When the first body 10 and the second body 20 are disposed to overlap each other, a closed configuration is implemented (not shown). And when the first body 10 is disposed to expose at least one part of the second body 20, an opened configuration is implemented. When the closed configuration is implemented, the portable terminal may be operated in a standby mode. However, the standby mode may be released by a user. When the opened configuration is implemented, the portable terminal may be operated in a call mode. However, the call mode may be converted into a standby mode by a user's manipulating or by lapse of a certain time.

A case (a casing, a housing, a cover, etc.) that defines an appearance of the first body includes a front case 11 and a rear case 12. Various electronic components may be mounted in a space formed by the front case 11 and the rear case 12 to provide one or more functions of the portable terminal. In addition, one or more middle cases (not shown) may be further disposed between the front case 11 and the rear case 12. The cases may be formed by injection-molding a synthetic resin, or may be formed of a metallic material such as a stainless steel (STS) or titanium (Ti).

A display portion 13, a first sound outputting portion 14, a first image inputting portion 15, and a first manipulating portion 16 may be disposed at the first body 10, particularly, at the front case 11. The display portion 13 may be a liquid crystal display (LCD) module for displaying information, an organic light emitting diodes (OLED) module, or any other suitable display. The display portion 13 may further include a touch screen for inputting information by a user's touch. The first sound outputting portion 14 may be implemented as a receiver or a speaker. The first image input portion 15 may be implemented as a camera module for capturing a user's image or a moving image. The first manipulating portion 16 receives a command to control an operation of the portable terminal according to the present invention.

In the same manner as the first body 10, a case of the second body 20 includes a front case 21 and a rear case 22. A second manipulating portion 23 is disposed at a front surface of the front case 21 of the second body 20. A third manipulating portion 24, a sound inputting portion 25, and an interface 26 is disposed at one of the front case 21 and the rear case 22 of the second body 20.

The first to third manipulating portions 16, 23 and 24 are referred to as a manipulating portion, and may be implemented in a user's tactile manner. For example, the manipulating portion may be implemented as a touch pad, a touch screen, or a dome switch that can receive information inputted by a user's pushing or touching the manipulation portion. Also, the manipulating portion may be implemented using a key rotating wheel, or may be implemented by combining a jog method and a handling method for a joy stick with each other.

In the first exemplary embodiment, the first manipulation portion 16 serves to input a starting command, an ending command, a scroll command, or the like, and the second manipulation portion 23 serves to input numbers, characters, symbols, or the like. Also, the third manipulation portion 24 may be implemented as a hot-key for performing a specific function such as an activation of the first image inputting portion 15 or any specific function associated with the current function of the phone. The sound inputting portion 25 may be implemented as a microphone so as to receive a user's voice, other sound, or the like.

The interface 26 serves as a passage through which the portable terminal of the present invention can perform a data exchange with an external device, etc. For example, the interface 26 may be one of a connection port connected to an earphone by wire or by radio, a near-distance communication port (e.g., IrDA port, a BLUETOOTH port, a wireless LAN port, etc.), or a power supplying port to supply power to the portable terminal. The interface 26 may be a subscriber identification module (SIM), or a user identity module (UIM), or a card socket for receiving an external card such as a memory card for storing information.

A power supplying portion 27 for supplying power to the portable terminal is disposed at the rear case 22. The power supplying portion 27 may be implemented as a detachable chargeable battery. Hereinafter, the power supplying portion 27 will be referred to as a battery 27.

Figure 2:
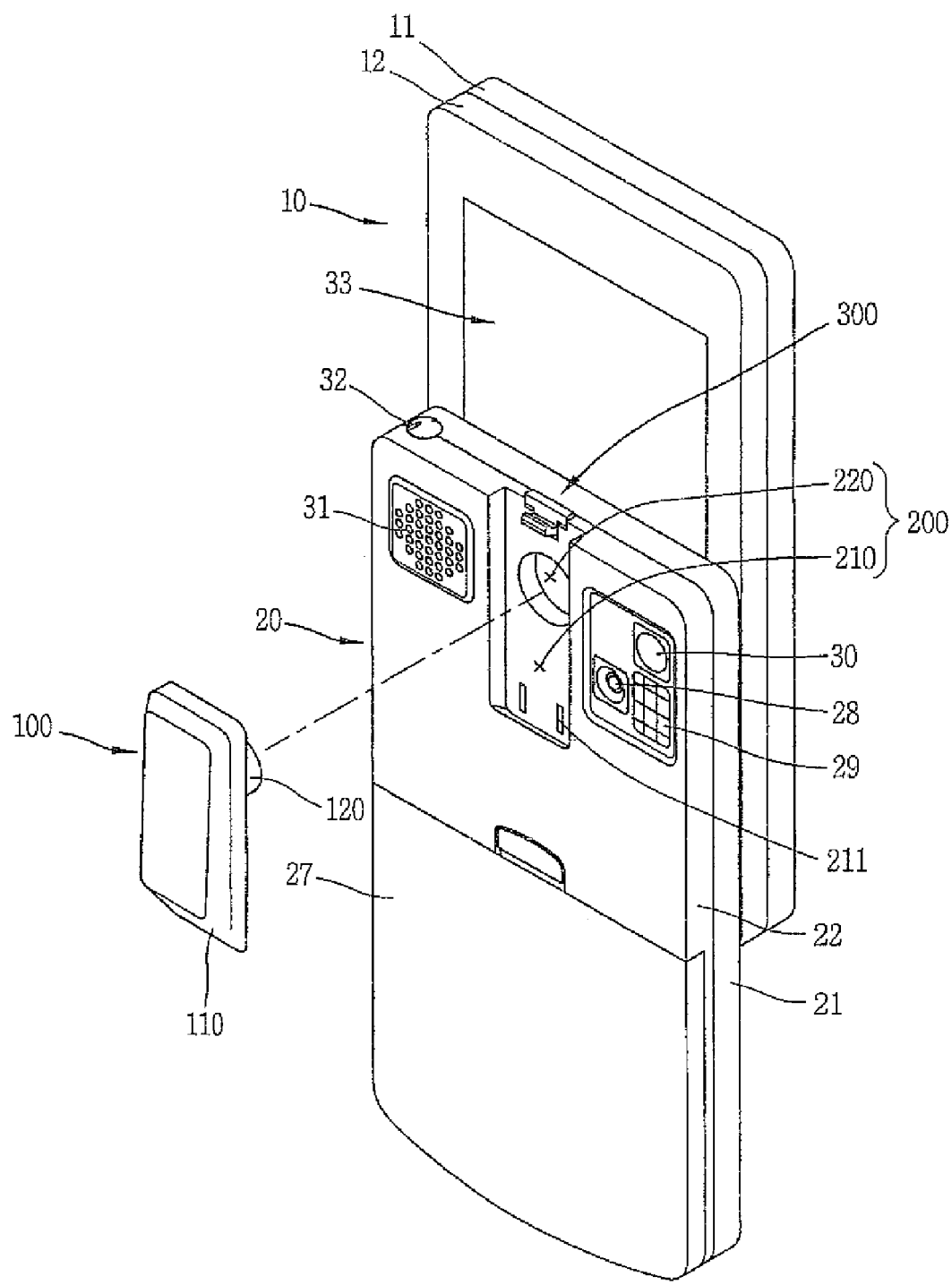
FIG. 2 is a rear perspective view showing the portable terminal of FIG. 1.

As shown in FIG. 2, a second image inputting portion 28 is provided at the rear case 22 of the second body 20. The second image inputting portion 28 may be a camera having an opposite image-capturing direction to the first image inputting portion 15 (see FIG. 1), and may have a different number of pixels from the first image inputting portion 15. For instance, the first image inputting portion 15 may be configured to capture an object using a low number of pixels so that a user's face captured during a video call can be directly transmitted to another party. The second image inputting portion 28 may be configured to capture an object with a high number of pixels so that a captured image has better detail capture.

A flash 29 and a mirror 30 are located near the second image inputting portion 28. When the second image inputting portion 28 is used to capture an object, the flash 29 provides light to the object. When a user is to capture his or her own image using the second image inputting portion 28, the user views himself or herself in the mirror 30.

A second sound outputting portion 31 is further disposed at the rear case 22. The second sound outputting portion 31 may implement a stereo function together with the first sound outputting portion 14 (see FIG. 1), or may be used in a speaker phone mode for a call function.

A broadcasting signal receiving antenna 32 is disposed at one side of the rear case 22. The broadcasting signal receiving antenna 32 is disposed at the second body 20 so as to be drawn-out during use. One part of a slide module 33 for slidably coupling the first body 10 and the second body 20 to each other is disposed at the rear case 12 of the first body 10. Another part (not shown) of the slide module 33 is disposed at the front case 21 of the second body 20.

In the aforementioned embodiment, the second image inputting portion 28 is disposed at the second body 20. However, the present invention is not limited to this configuration. For instance, at least one of the components disposed at the rear case 22 such as the second image inputting portion 28 and the broadcasting signal receiving antenna 32 may be disposed at the first body 10, more concretely, at the rear case 12. In this arrangement, the components disposed at the rear case 12 can be protected by the second body 20 in a closed configuration. Furthermore, even if the second image inputting portion 28 is not provided, the first image inputting portion 15 may capture an image even in a direction of the second image inputting portion 28 by being rotated.

The portable terminal also includes an earpiece mounting portion 200 located at a rear surface of the second body 20 and an earpiece 100 detachably mountable to the earpiece mounting portion 200. The earpiece 100 includes an earpiece body 110, and a speaker portion 120 for outputting sound transmitted from the earpiece body 110. The earpiece mounting portion 200 includes a first mounting portion 210 configured to receive the earpiece body 110 of the earpiece, and a second mounting portion 220 configured to receive the speaker portion 120.

The earpiece mounting portion 200 is disposed at an upper side of a battery mounting portion where the battery 27 is mounted. The first mounting portion 210 is concavely formed so as to be recessed from a surface of the second body 20 so that the earpiece body portion 110 can be partially mounted below the surface of the second body 20. The second mounting portion 220 is formed at the first mounting portion 210 in a form of a hole corresponding to a shape of the speaker portion 120. A power supplying port 211 for supplying power to the earpiece 100 is disposed at the first mounting portion 210.

While the aforementioned embodiment shows the earpiece mounting portion 200 being disposed at an upper end of a rear surface of the second body 20, it is understood that the earpiece mounting portion 200 may be located at various positions in the first body 10 and the second body 20 according to the design of the portable terminal.

Figure 3:
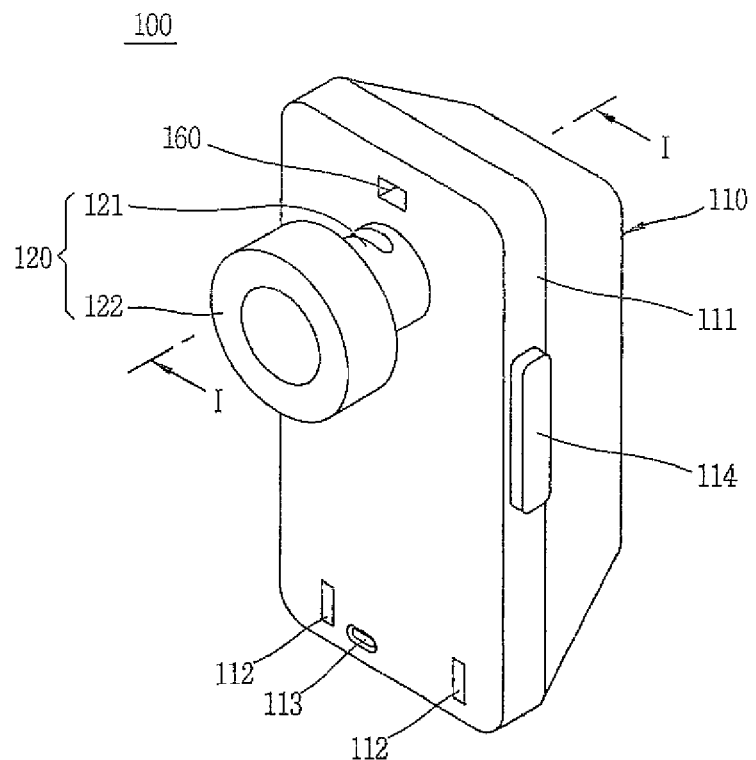
FIG. 3 is a perspective view showing an earpiece according to a first embodiment of the present invention.
Figure 4:
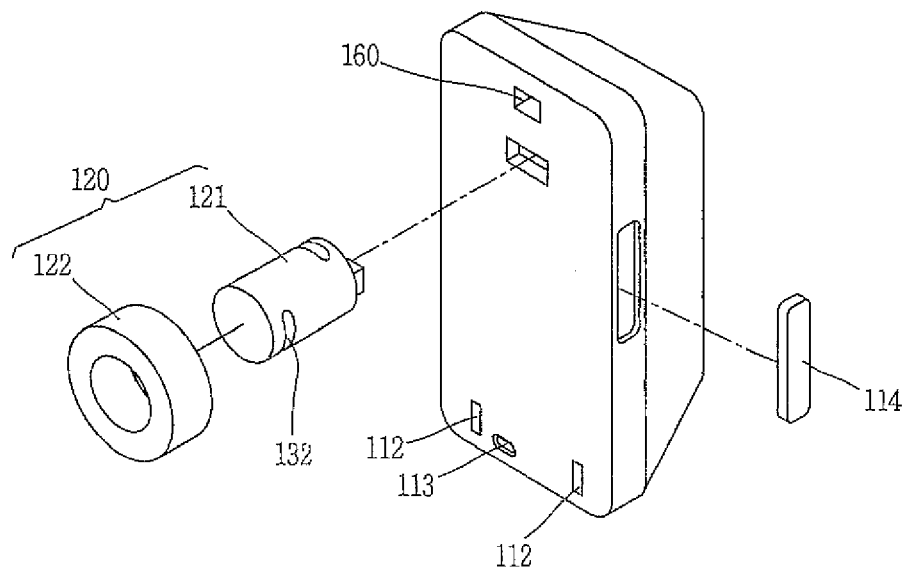
FIG. 4 is a disassembled perspective view showing the earpiece of FIG. 3.

As shown in FIGS. 3 and 4, the earpiece body 110 of the earpiece 100 includes a housing 111 that forms an appearance of the earpiece body 110, a near-distance wireless communication module (not shown) located in the housing 111, and a built-in battery (not shown).

The near-distance wireless communication module mounted in tire housing 111 (hereinafter, will be referred to as 'a first near-distance wireless communication module') is wirelessly connected to a near-distance wireless communication module mounted in the second body 20 (hereinafter, will be referred to as 'a second near-distance wireless communication module'), thereby transmitting and receiving signals between each other. The first near-distance wireless communication module receives a signal transmitted to the second near-distance wireless communication module from outside, or transmits a signal transmitted to the earpiece body from outside to the second near-distance wireless communication module. The second near-distance communication module may be mounted in the first body 10 or the second body 20 according to an arrangement of components inside the first and second bodies 10 and 20.

As a near-distance wireless communication module (not shown), a BLUETOOTH module may be used. Here, BLUETOOTH refers to a standard by which a near-distance wireless communication is performed with a low power transmission between wireless communication devices such as a mobile computer, a portable terminal, a headset, a personal digital assistant (PDA), and a personal computer (PC).

As noted above, the built-in battery for supplying power to the earpiece 100 is mounted inside the housing 111. A battery contacting port 112 is disposed outside the housing 111 so that when the earpiece 100 is mounted at the earpiece mounting portion 200, the battery contacting port 112 comes in contact with the power supplying port 211 of the earpiece mounting portion 200. Accordingly, the built-in battery of the earpiece is charged by power from the battery 27 located at the second body 20. As a result, once the earpiece 100 is mounted at the earpiece mounting portion 200, the earpiece 100 can be charged without requiring an additional charger.

A microphone 113 for inputting sound is located at the housing 111. Once sound is inputted to the earpiece body 110 through the microphone 113, the first near-distance wireless communication module of the earpiece body 110 transmits the inputted sound to the second near-distance wireless communication module of the second body 20.

A key button 114 for inputting information is also located at the housing 111. Under a state that the earpiece 100 is used by being separated from the second body 20 by a user, when a call sound is detected through the speaker portion 120, the user can operate a call mode by pressing the key button 114.

When the user is to convert a current mode into a call mode while listening to an MP3, the key button 114 may be also used. While the exemplary embodiment only shows one key button 114 located at the housing 111 of the earpiece body 110, it is understood that a plurality of key buttons 114 may be mounted if necessary to implement various input functions or other commands.

The speaker portion 120 is connected to the earpiece body 110, thereby outputting sound transmitted from the first near-distance wireless communication module. The speaker portion 120 is formed to be insertable into a user's ear so that outputted sound can be transmitted to the user and is formed to have a controllable length so as to reduce a thickness of the earpiece 100 when the earpiece 100 is detachably mounted in the earpiece mounting portion 200.

The speaker portion 120 includes a speaker body 121 protruding from one side surface of the earpiece body 110 and a supporting member 122 movably mounted at the speaker body 121. The speaker body 121 may be formed in a cylindrical shape having one end perpendicularly extending from one side surface of the earpiece body 110. A speaker electrically connected to the earpiece body 110 is located in the speaker body 121, thereby outputting a signal transmitted from the first near-distance wireless communication into sound. The supporting member 122 may be mounted on an outer circumferential surface of the speaker body 121 so as to be slidably movable in a length direction of the speaker body 121. The supporting member 122 may be formed in a doughnut shape so as to be inserted into a user's ear and to be supported therein.

When the earpiece 100 is detachably mounted to the earpiece mounting portion 200, the supporting member 122 is moved so that one surface thereof can come in contact with the earpiece body portion 110 (hereinafter, will be referred to as a 'drawn-in' state). Accordingly, a thickness of the earpiece 100 is reduced. When the earpiece 100 is inserted into a user's ear, the supporting member 122 is moved in a direction to be spaced from the earpiece body portion 110 (hereinafter, will be referred to as a 'drawn-out' state). As the earpiece body portion 110 and the supporting member 122 are disposed to have a certain gap therebetween, the earpiece 100 is securely supported in the user's ear.

Figure 5:
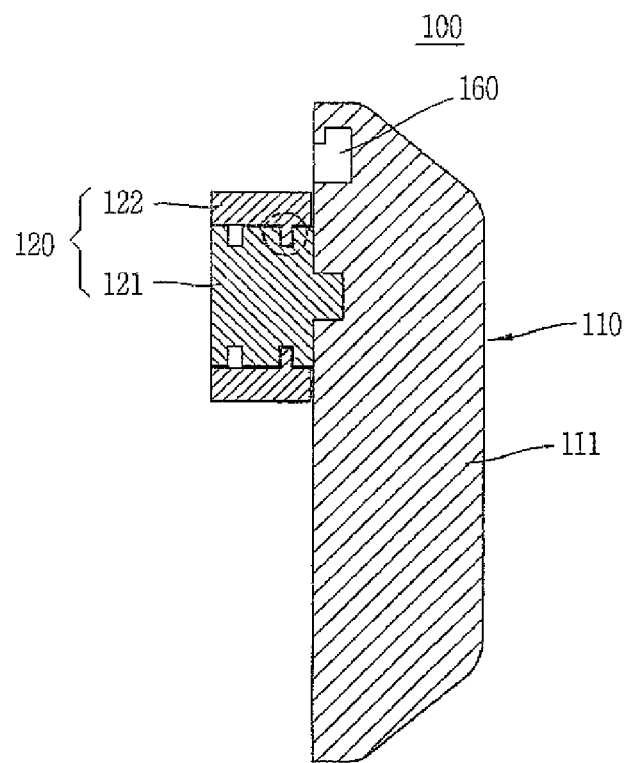
FIGS. 5 and 6 are side sectional views showing the earpiece of FIG. 3.
Figure 5A:
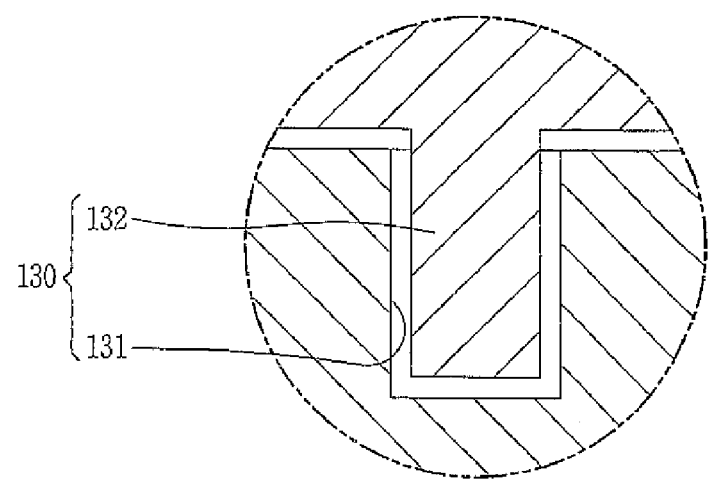
FIG. 5A is a detail view of the guiding portion of FIG. 5.
Figure 6:
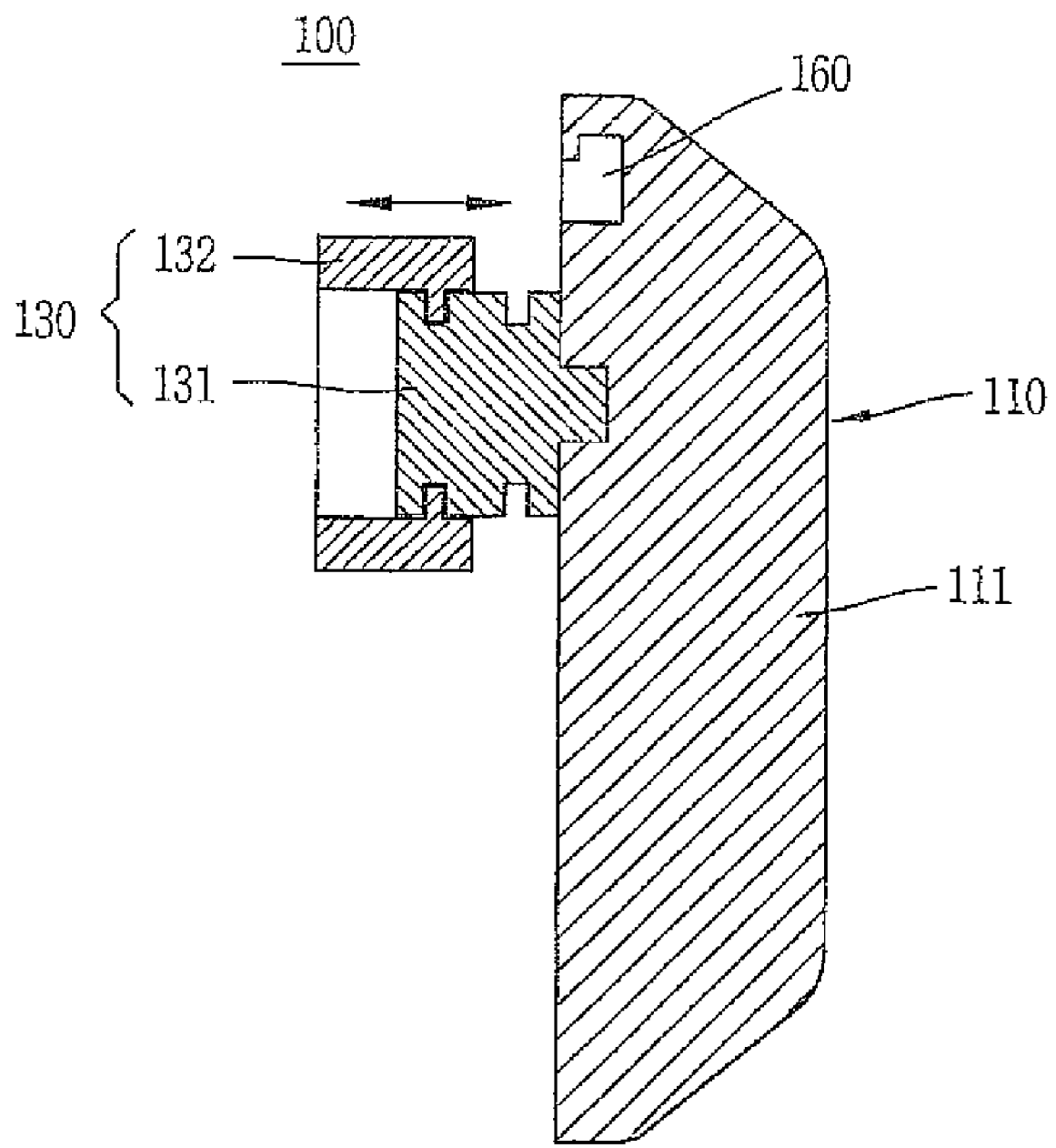

A method for controlling a thickness of the earpiece 100 by moving the supporting member 122 of the speaker portion 120 to the speaker body 121 will now be explained in more detail. As shown in FIGS. 5 and 6, a guide portion 130 is formed between the speaker body 121 and the supporting member 122 to guide the supporting member 122 as it is linearly moved on an outer circumferential surface of the speaker body 121.

In this exemplary embodiment, the supporting member 122 is moved along the length of the speaker body 121 as the supporting member 122 is rotated. When a user rotates the supporting member 122 of the earpiece 100 in a first direction, the supporting member 122 is drawn out. When the user rotates the supporting member 122 in an opposite direction to the first direction, the supporting member 122 is drawn in.

The guide portion 130 includes a guide slot 131 spirally formed on an outer circumferential surface of the speaker body 121, and a guide protrusion 132 protruding from a contact surface between the supporting member 122 and the speaker body 121. The guide protrusion 132 is configured to be inserted into the guide slot 131 to be moved along the guide slot 131. When a user rotates the supporting member 122 so as to draw out the supporting member 122, the guide protrusion 132 of the supporting member 122 is moved along the guide slot 131 spirally disposed at the speaker body 121, and thus the supporting member 122 is drawn-out. The supporting member 122 is drawn in by reversing the direction of rotation and the guide protrusion 132 of the supporting member 122 is moved along the guide slot 131 spirally in the same manner as when the supporting member 122 is moved to the drawn-out state.

Figure 7:
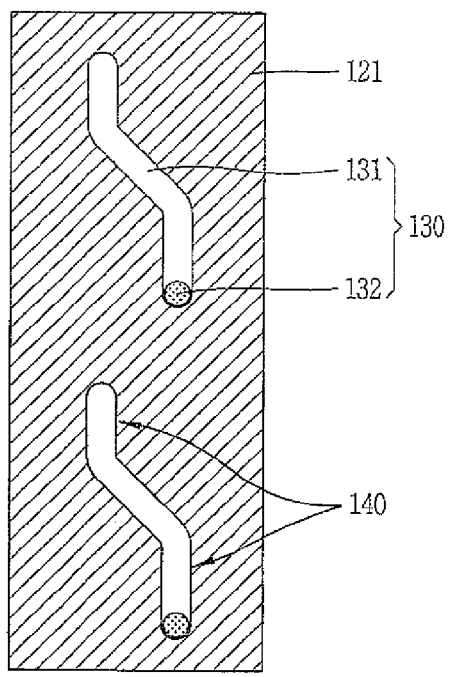
FIGS. 7 and 8 are schematic views showing guide slots formed in a speaker body according to the first embodiment of the present invention.
Figure 8:
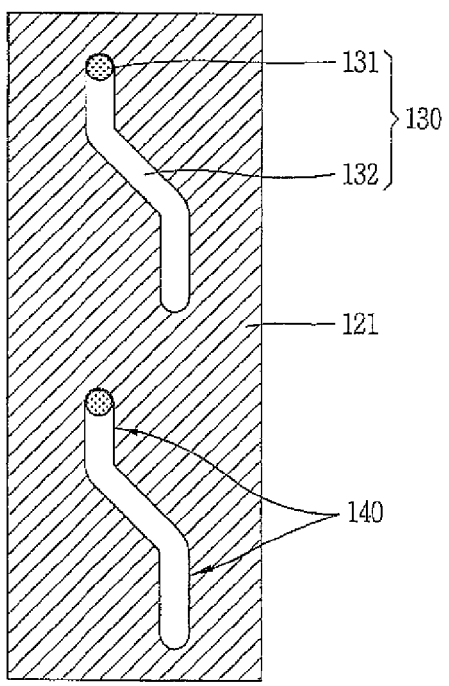

As shown in FIGS. 7 and 8, a fixing portion 140 is formed at both ends of the guide slot 131 for holding the guide protrusion 132 so as to maintain a drawn-in state or a drawn-out state of the supporting member 122. The fixing portions 140 are formed so that the ends of the guide slot 131 can be perpendicular to a drawn-in/drawn-out direction of the supporting member 122. Accordingly, when an external force is supplied to the supporting member 122, the supporting member 122 is prevented from moving while maintaining a drawn-in state (FIG. 7) or a drawn-out state (FIG. 8).

Figure 9:
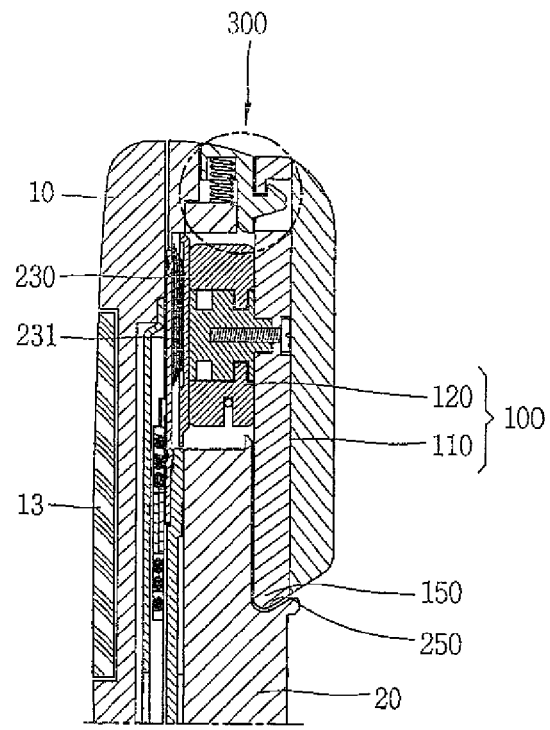
FIGS. 9 and 9A are a partial cross-sectional views taken along the center line of the earpiece and the portable terminal of the first exemplary embodiment where the earpiece is detachably mounted at the portable terminal and a detail view of the locking unit, respectively.
Figure 9A:
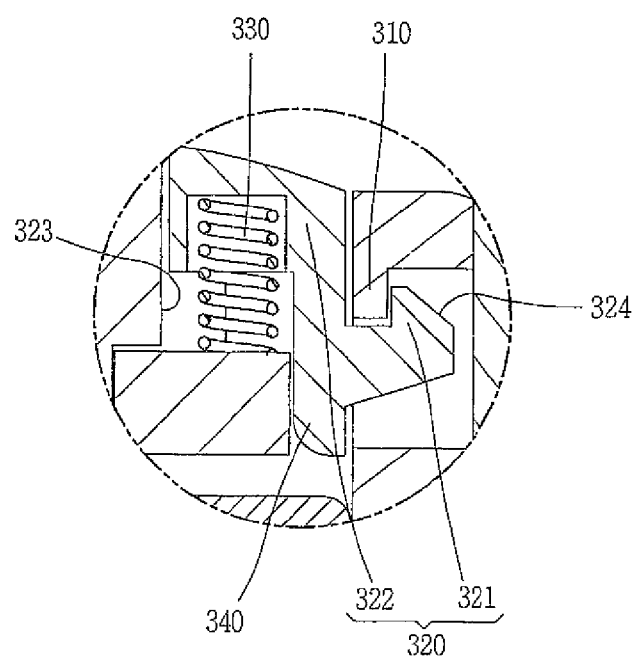
Figure 10:
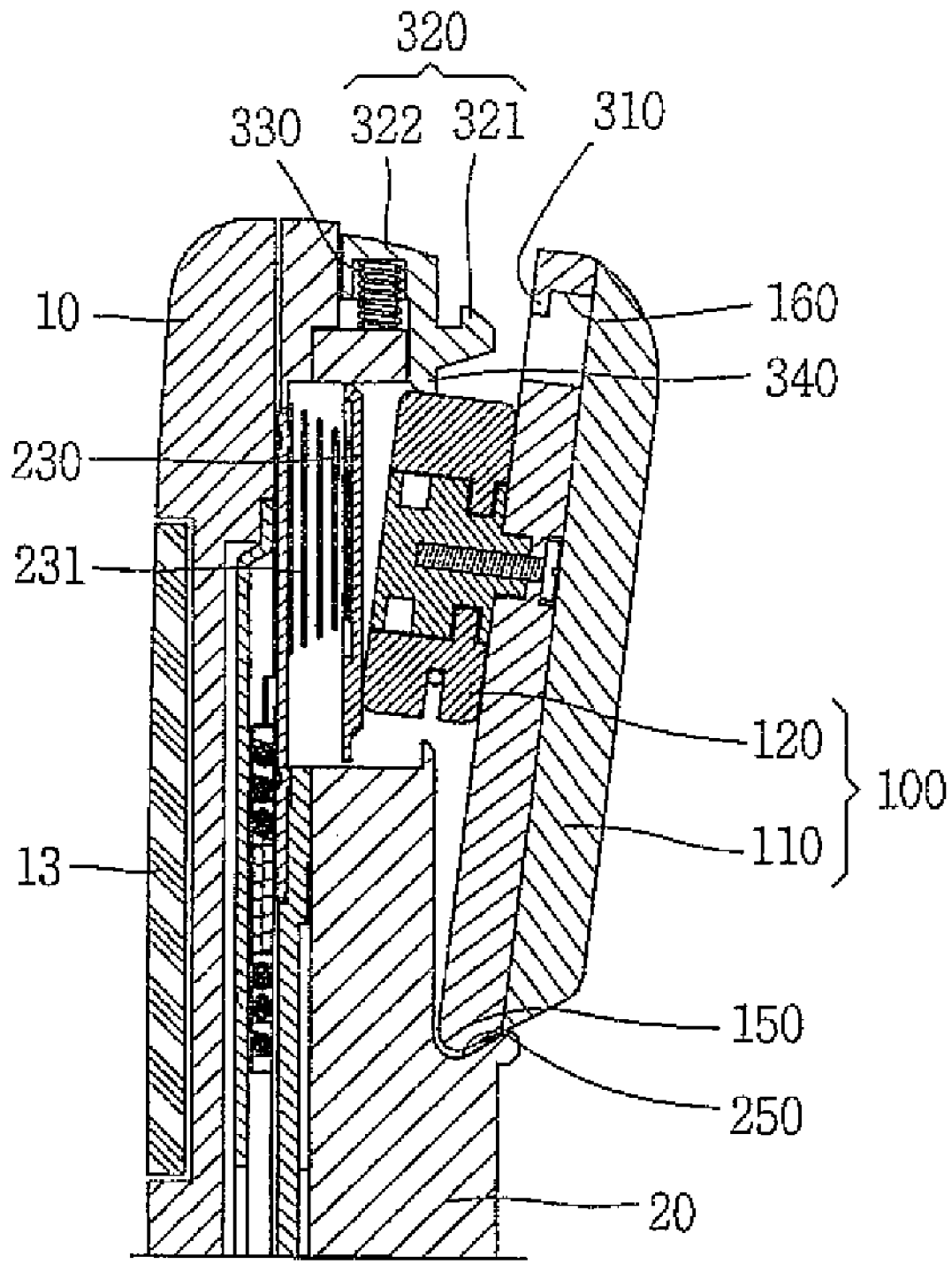
FIGS. 10 and 11 are partial cross-section views taken along the center line of the earpiece and portable terminal of the first exemplary embodiment in various states of assembly/disassembly.
Figure 11:
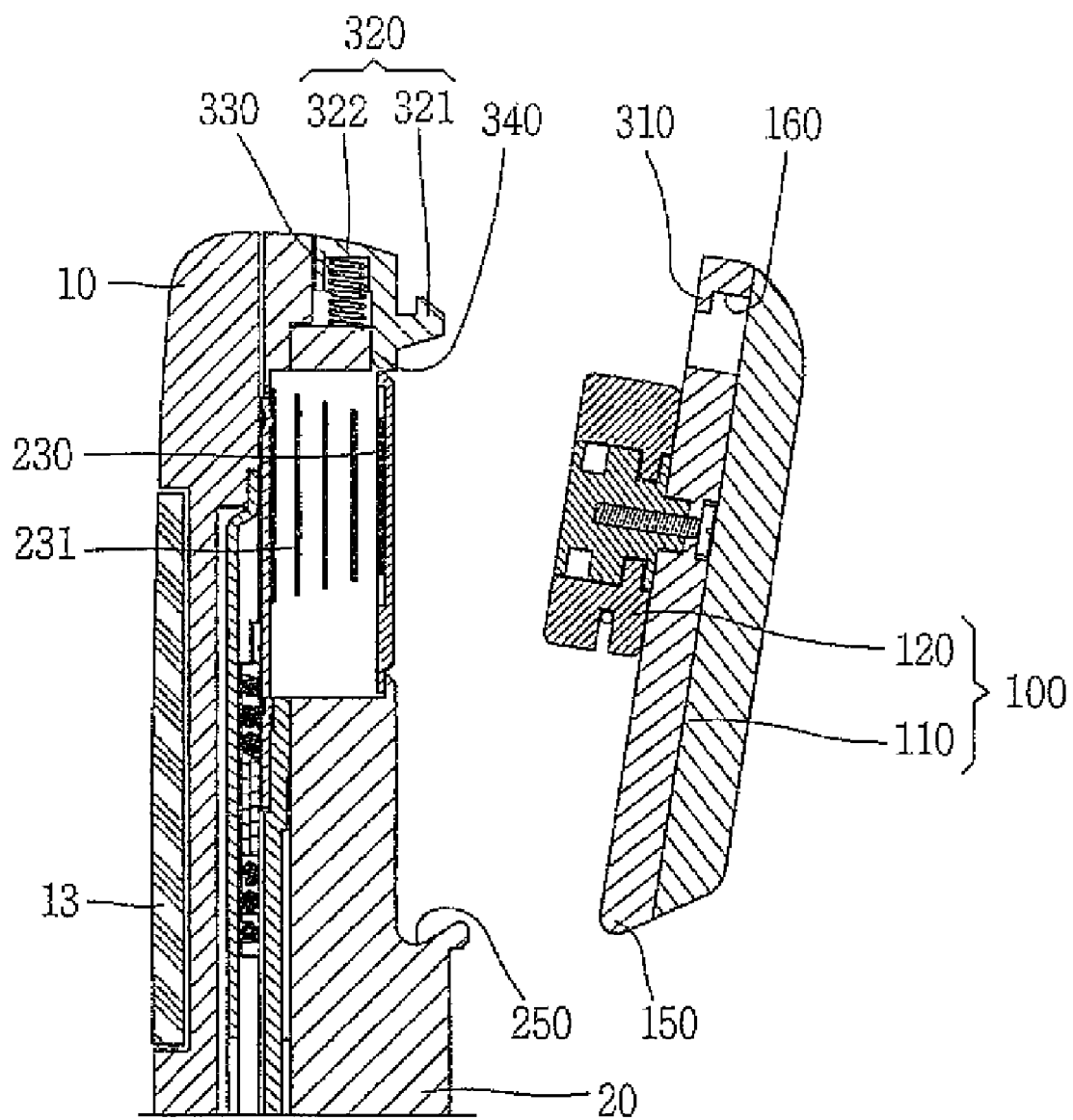
Figure 12:
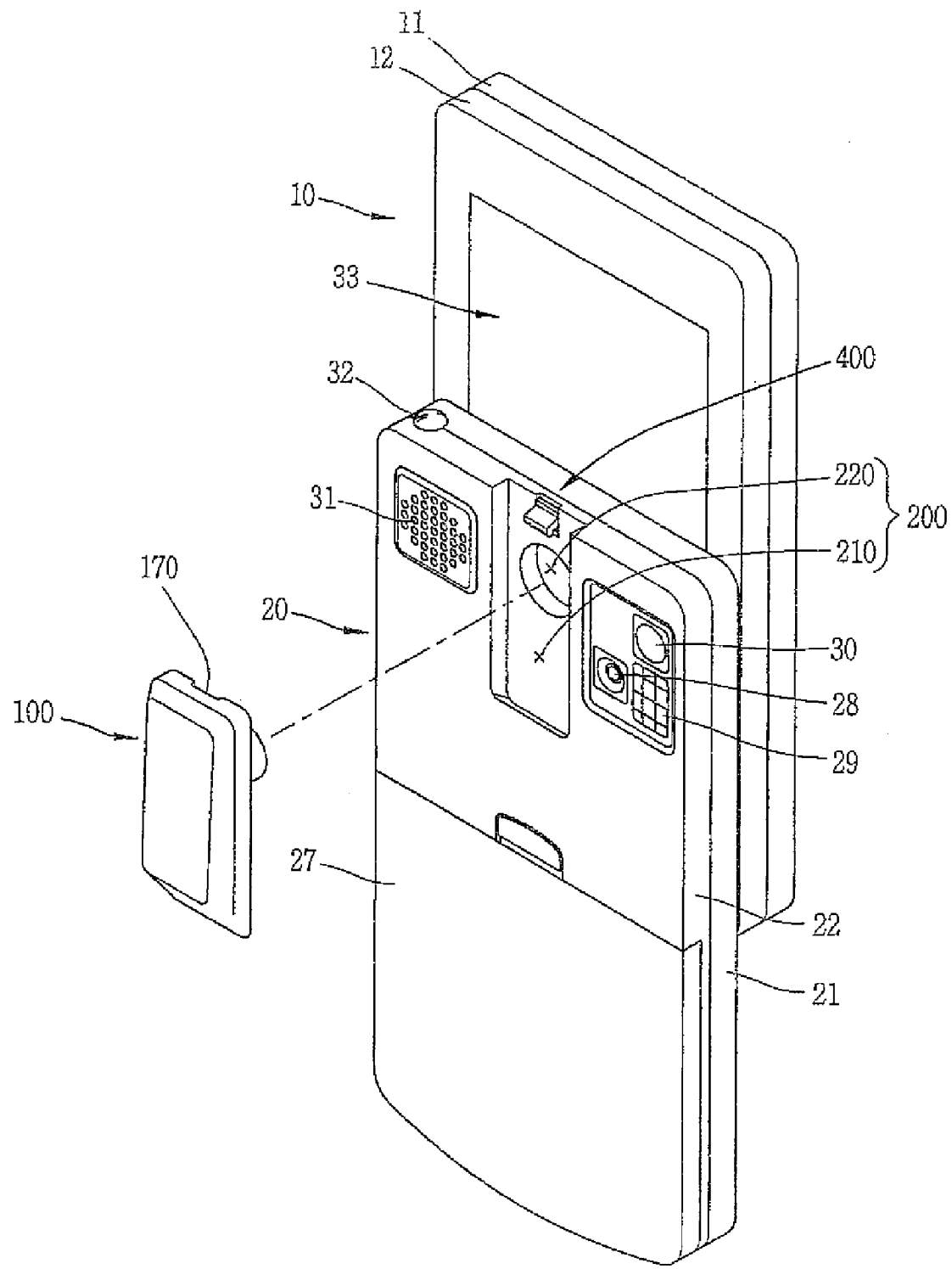
FIG. 12 is a rear perspective view showing a portable terminal according to a second exemplary embodiment of the present invention.

As shown in FIGS. 9 to 11, the portable terminal according the first exemplary embodiment includes a cover 230 located at the earpiece mounting portion 200. The cover 230 is configured to cover the earpiece mounting portion 200 when the earpiece 100 is detached from the earpiece mounting portion 200. In particular, the cover 230 is located in the second mounting portion 220, and is configured so as to be linearly movable in a direction that the earpiece 100 is detached from the earpiece mounting portion 200.

An elastic member 231 for providing an elastic force to linearly displace the cover 230 may be disposed between the cover 230 and the second mounting portion 220. Preferably, the elastic member 231 is a conical coil spring so as to minimize a mounting space of the earpiece.

As shown in FIG. 9, when the earpiece 100 is detachably mounted at the earpiece mounting portion 200, the cover 230 covers into contact with the earpiece 100 and the elastic member 231 is in a compressed state. As shown in FIG. 11, when the earpiece 100 is detached from the earpiece mounting portion 200, the cover 230 is moved by an elastic force in a direction that the earpiece 100 is detached from the earpiece mounting portion 200. Accordingly, the cover 230 covers the second mounting portion 200.

Further, a locking unit 300 is provided at the earpiece 100 and the earpiece mounting portion 200 for securing or releasing the earpiece 100 to/from the earpiece mounting portion 200. The earpiece 100 is configured to be rotated about one end secured by the earpiece mounting portion 200 to allow the earpiece to be mounted at and detached from the earpiece mounting portion 200.

The earpiece mounting portion includes an earpiece fixing recess 250 located at a lower end thereof to releasably secure the one end of the earpiece 100. The earpiece includes a fixing portion 150 at a lower end of the earpiece body 110 to be releasably secured by the earpiece fixing recess 230. Also, a locking recess 160 is formed at an upper end of the earpiece body 110 for releasably securing the earpiece 100 to the earpiece mounting portion 200.

The locking unit 300 also includes a hooking protrusion 310 located at the locking recess 160, a locking member 320 movably disposed at the earpiece mounting portion 200, and an elastic member 330, in the form of a spring, for providing an elastic force to the locking member 320. The hooking protrusion 310 protrudes from an inner wall of the locking recess 160 so as to lock the locking member 320 when the earpiece 100 is detachably mounted at the earpiece mounting portion 200.

A guide recess 323 for guiding a motion of the locking member 320 is formed in the second body 20. The locking member 320 is inserted into the guide recess 323 to be received in the second body 20. The locking member 320 is configured to be moved by contacting the hooking protrusion 310 when the earpiece 100 is detachably mounted at the earpiece mounting portion 200, and then to be restored to its original position thereby to be held by the hooking protrusion 310.

The locking member 320 includes a locking hook 321 locked by the hooking protrusion 310 thus to be fixed, and a button portion 322 extending from one side of the locking hook 321 and pressed by a user. The locking hook 321 is provided with an inclined surface 324 for moving the locking member 320 by contacting the hooking protrusion 310 when the earpiece 100 is detachably mounted at the earpiece mounting portion 200. The button portion 322 is disposed to be exposed outside the second body 20 so as to be pressed by a user. The spring 330 is disposed between the button portion 322 and the earpiece mounting portion 200, and provides an elastic force to the locking member 320 in a direction that the locking member 320 is locked by the hooking protrusion 310.

An operation of the locking unit 300 will now be explained. When the fixing portion 150 formed at the lower end of the earpiece 100 is fixed by the earpiece fixing recess 250 of the first mounting portion, the earpiece 100 is detachably mounted in the earpiece mounting portion 200. While the earpiece 100 is being detachably mounted in the earpiece mounting portion 200, the locking hook 321 and the hooking protrusion 310 come in contact with each other, and the locking member 320 is moved towards a lower side of the second body 20. Then, the locking hook 321 is held by the hooking protrusion 310 by an elastic force of the spring 330, thereby locking the earpiece 100 to the earpiece mounting portion 200.

As shown in FIG. 10, when the button portion 322 is pressed, the locking member 320 is linearly moved to be unlocked from the hooking protrusion 310. Accordingly, the earpiece 100 is separated from the earpiece mounting portion 200. As shown in FIG. 11, when the earpiece 100 is separated from the earpiece mounting portion 200, the locking member 320 is restored to the original position by an elastic force of the spring 330.

A friction portion 340 that frictionally contacts the earpiece 100 when the locking member 320 is pressed may be formed at one side of the locking member 320 so as to prevent the earpiece 100 from freely moving when the earpiece 100 is separated from the earpiece mounting portion 200.

As described above, the earpiece 100 receives an elastic force by the elastic member 231 disposed between the cover 230 and the second mounting portion 220 in a direction that the earpiece 100 is separated from the earpiece mounting portion 200. As a result, if the earpiece 100 is separated from the earpiece mounting portion 200 as the button portion 322 is pressed, the earpiece 100 may be forced from the earpiece mounting portion 200 by the elastic force. Because the friction portion 340 is formed at one side of the locking member 320 in a form of a protrusion protruding in a direction that the button portion 322 is pressed, the friction portion 340 minimizes the distance the earpiece 100 is displaced due to the elastic force of the elastic member 231.

As shown in FIG. 10, when the button portion 322 is pressed, the locking member 320 is linearly moved and thus the friction portion 340 frictionally contacts the earpiece 100. As shown in FIG. 11, while the locking member 320 is restored to the original position by an elastic force of the spring 330, a frictional force applied between the friction portion 340 and the earpiece 100 is gradually decreased.

The frictional force is applied between the friction portion 340 and the earpiece 100 in an opposite direction to a direction of an elastic force applied to the earpiece 100 from the elastic member 231. Accordingly, a deviated degree of the earpiece 100 from the earpiece mounting portion 200 is minimized by the friction portion 34.

A second exemplary embodiment of the present invention, as shown in FIGS. 12-15, is similar to the first exemplary embodiment with the exception of the configuration of the locking unit 400. In this embodiment, the locking member 420 includes a locking hook 421 held by the hooking protrusion 410 thus to be fixed, and a moving portion 422 extending from one side of the locking hook 421 and moving along a guide recess 430 formed at the second body 20.

The locking hook 421 is formed in an opposite direction to the locking hook 321 of FIG. 9. The locking hook 421 has first and second inclined surfaces 423 and 424 (see FIG. 14A) for moving the locking hook 421 by contacting the hooking protrusion 410 of the locking recess 160 when the earpiece 100 is mounted or detached to/from the earpiece mounting portion 200. The moving portion 422 is configured to be movable inside the guide recess 430 when a force is applied to the locking hook 421 by the hooking protrusion 410 at the time of mounting or detaching the earpiece 100 to/from the earpiece mounting portion 200.

An elastic member 440, in the form of a spring, for providing an elastic force to the locking hook 420 in a direction that the locking hook 420 is held by the hooking protrusion 410 is mounted between the moving portion 421 of the locking hook 420 and the guide recess 430. Even if the locking hook 420 is moved by a force provided from the hooking protrusion 410, the locking hook 420 is restored to the original position by the elastic force of the spring 440.

An operation of the locking unit 400 will now be explained. When the earpiece 100 is moved to be adjacent to the earpiece mounting portion 200 (a 'drawn-in' state), the hooking protrusion 410 of the locking recess 160 comes into contact with the locking hook 421 of the locking member 420. Here, if a user applies a force to the earpiece 100 in a direction to draw-in the earpiece mounting portion 200, a force is applied to the locking hook 420 by the hooking protrusion 410. For purposes of description, the drawn-in direction of the hooking protrusion 410 is a first direction (1), and a direction perpendicular to the first direction (1) is a second direction (2).

Figure 14:
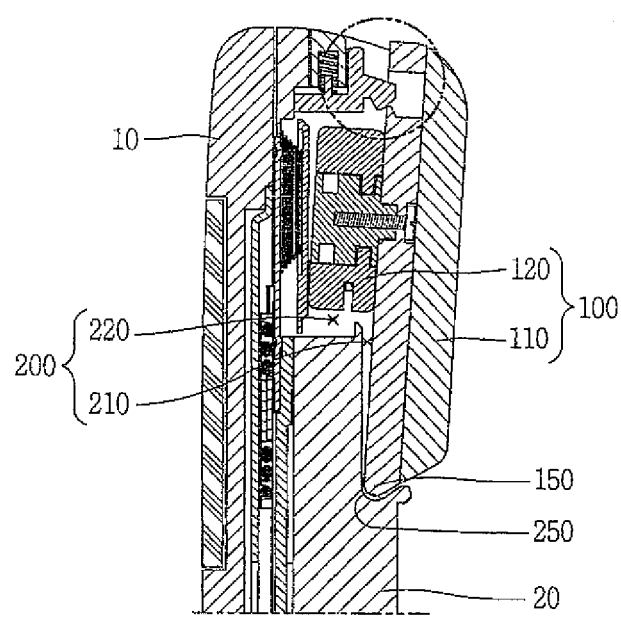
Figure 14A:
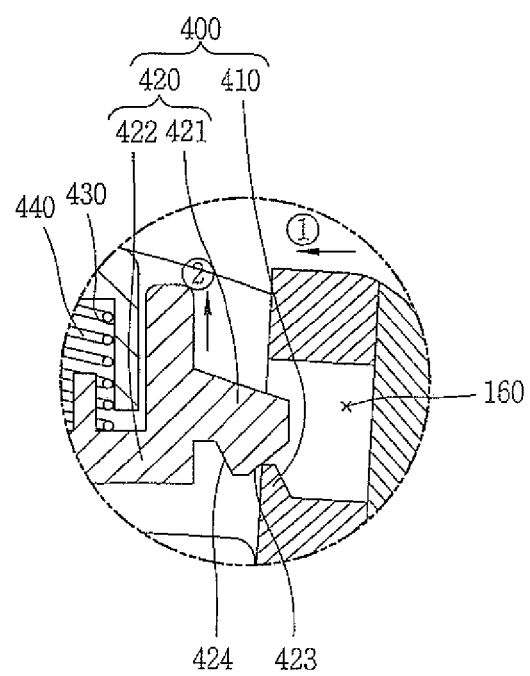
FIGS. 14A and 15A are detail views of the locking units shown in FIGS. 14 and 15, respectively.

The first inclined surface 423 is formed at the locking hook 421, and the locking member 420 is moved in the second direction of (2) by the first inclined surface 423 as the hooking protrusion 410 applies a force to the locking hook 421. The second inclined surface 424 extending from the first inclined surface 423 and having an opposite inclination to the first inclined surface 423 is formed at the locking hook 421. As shown in FIG. 14, when the hooking protrusion 410 reaches the second inclined surface 424 via the first inclined surface 423, the locking member 420 is moved in an opposite direction to the second direction (2). Here, the spring 440 provides an elastic force to the locking member 420 in an opposite direction to the second direction (2).

When the locking hook 421 and the hooking protrusion 410 are engaged to each other as the locking member 420 is restored to the original position after moving in the second direction (2), the earpiece 100 is detachably mounted at the earpiece mounting portion 200. If a user applies a force in a direction that the earpiece 100 is separated from the earpiece mounting portion 200, the hooking protrusion 410 applies a force to the locking hook 420.

A release recess 170 (see FIG. 12) may be formed at an upper end of the earpiece body 110. The release recess 170 is recessed from a surface of the earpiece body 110 facing the first mounting portion 210 and forms a space between the first mounting portion 210 and the earpiece body 110. A user may apply a force in an opposite direction to the first direction (1) by inserting his finger into the release recess 170, thereby separating the earpiece 100 from the earpiece mounting portion 200.

Figure 13:
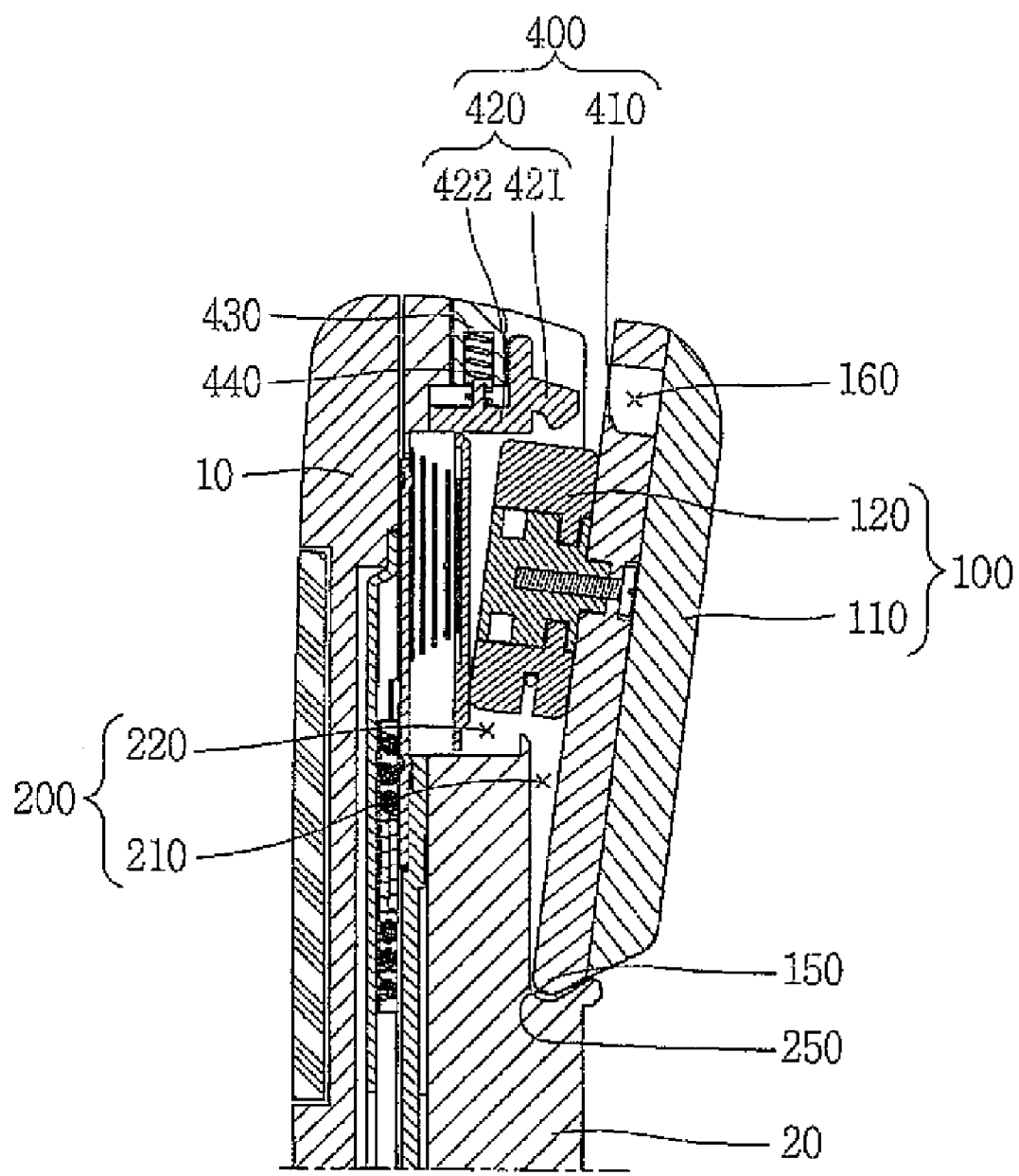
FIGS. 13 to 15 are partial cross-section views taken along the center line of the earpiece and portable terminal of the second exemplary embodiment in various states of assembly/disassembly.
Figure 15:
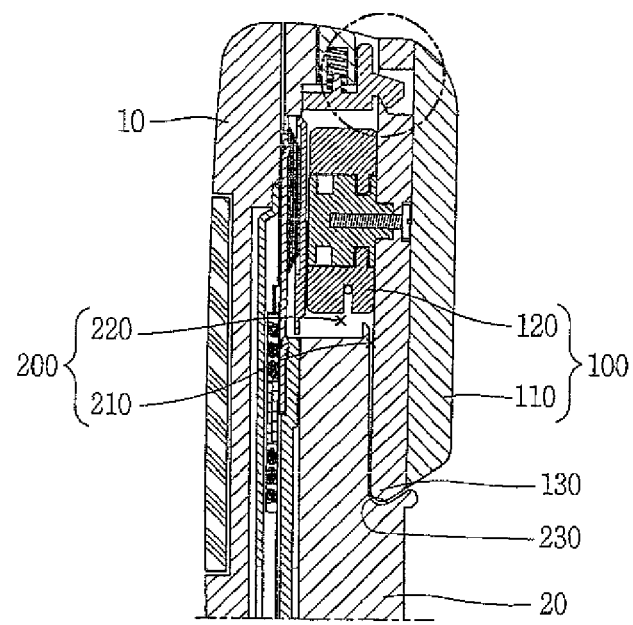
Figure 15A:
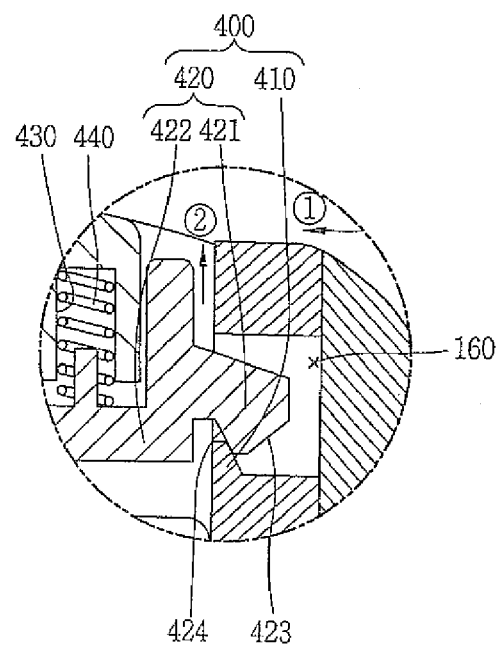
Figure 16:
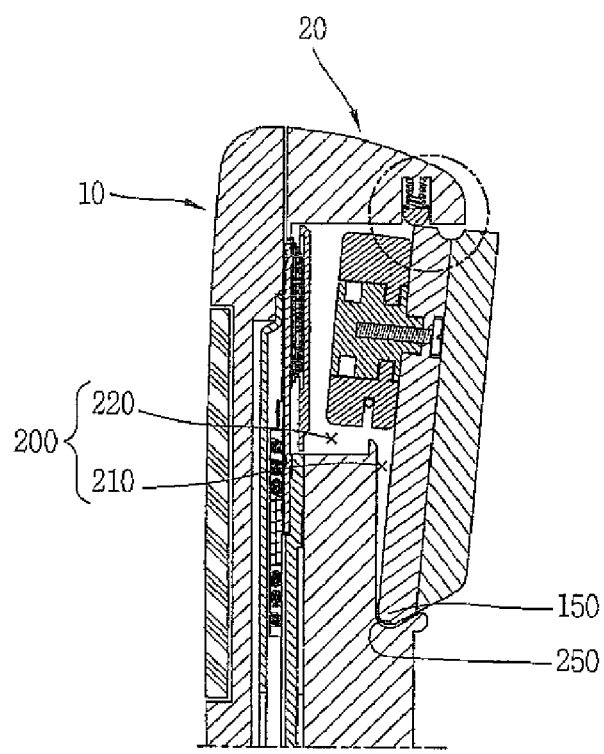
FIGS. 16 and 16A are a partial cross-sectional views taken along the center line of the earpiece and the portable terminal according to a third exemplary embodiment of the present invention and a detail view of the locking unit, respectively.
Figure 16A:
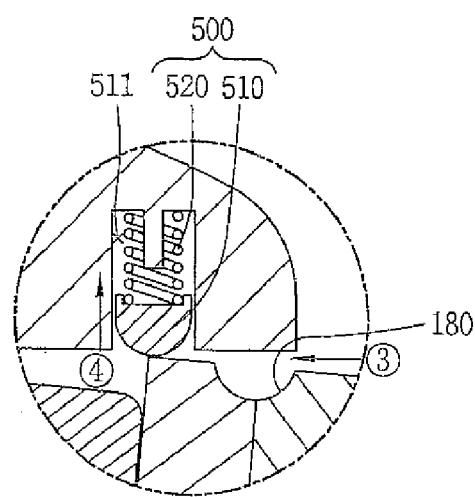
Figure 17:
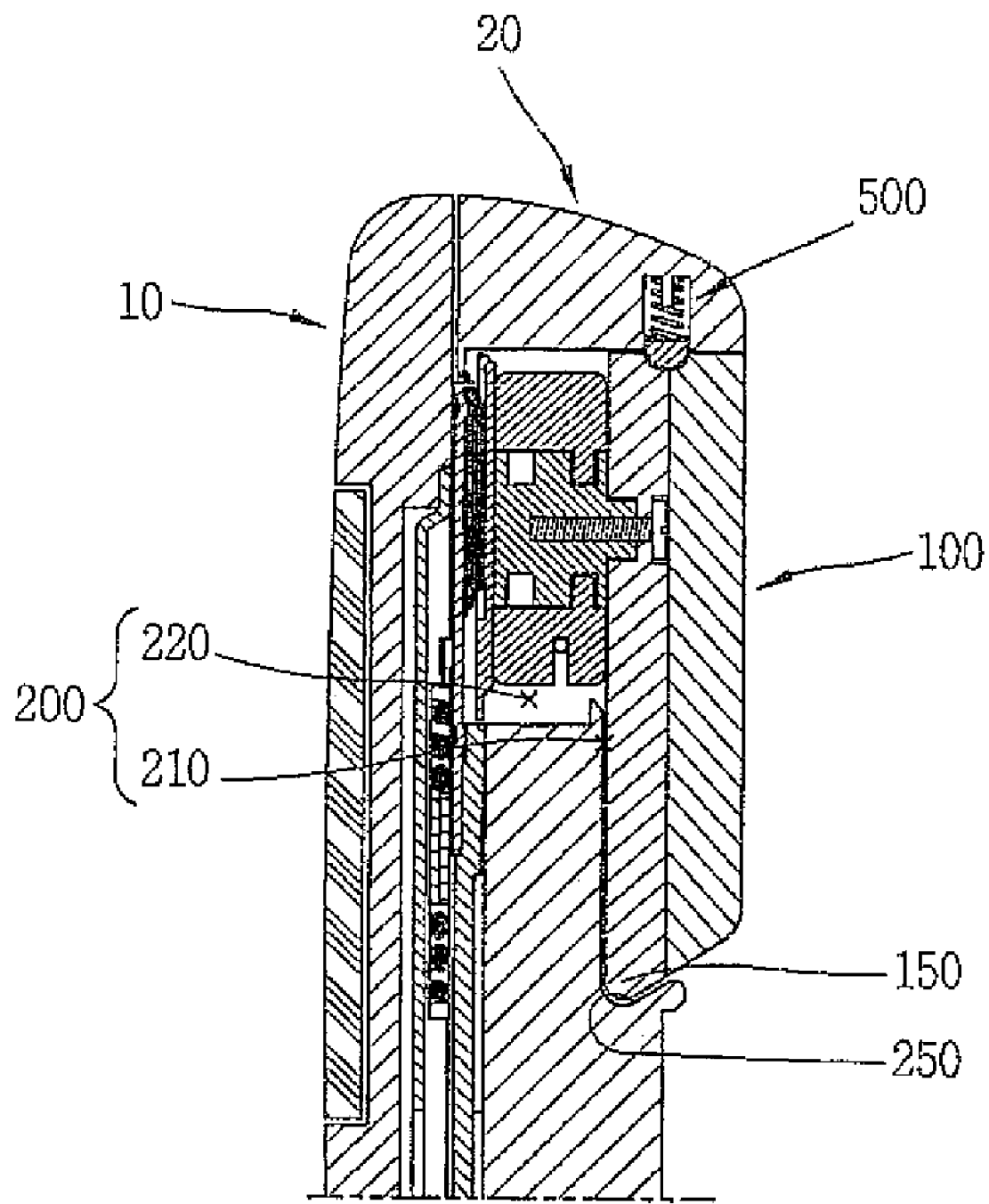
FIG. 17 is a partial cross-section view taken along the center line of the earpiece and portable terminal of the third exemplary embodiment, where the earpiece is detachably mounted at tire portable terminal.

As shown in FIG. 15, the second inclined surface 424 formed at the locking hook 421 is moved in the second direction (2) with a contact state to the hooking protrusion 410. In order to move the locking member 420, the hooking protrusion 410 has to provide the locking hook 421 with a force exceeding an elastic force applied to the locking member 420 from the spring 440. As shown in FIGS. 13 and 14, once the hooking protrusion 410 reaches the first inclined surface 423 via the second inclined surface 424, the force for locking the earpiece 100 is released and thus the earpiece 100 is detached from the earpiece mounting portion 200.

The locking unit according to the this exemplary embodiment serves to detachably mount the earpiece 100 to the earpiece mounting portion 200 by applying a force to the earpiece 100 in the first direction (1) by a user, or serves to detach the earpiece 100 from the earpiece mounting portion 200 by applying a force to the earpiece 100 in an opposite direction to the first direction (1). Under the detachable structure of the locking portion, the user can mount or detach the earpiece 100 to/from the second body 20 without an additional operation such as pressing of the button portion.

A third exemplary embodiment of the present invention, as shown in FIGS. 12-15, is similar to the first and second exemplary embodiments with the exception of the configuration of the locking unit 500. The locking unit 500 includes a locking member 510, in the form of a locking member, movably disposed at the earpiece mounting portion 200, and an elastic member 520, in the form of a spring, disposed between the locking ball 510 and the second body 20 to provide an elastic force to the locking ball 510. For purposes of description the earpiece 100 is moved towards the earpiece mounting portion 200 in a third direction (3), and a direction perpendicular to the third direction (3) is a fourth direction (4).

A guide recess 511 for guiding a motion of the locking ball 510 is formed in the second body 20. The locking ball 510 is inserted into the guide recess 511 so as to be moved in the guide recess-511. The spring 520 supports the locking ball 510 by providing an elastic force to the locking ball 510 in an opposite direction to the fourth direction (4).

The locking recess 180 is formed on an upper surface of the earpiece body 110 in a circular recess form corresponding to the locking ball 510. As the locking ball 510 is inserted into the locking recess 180, the earpiece 100 is fixed to the earpiece mounting portion 200.

An operation of the locking unit 500 will now be explained. When the earpiece 100 is moved in the third direction (3), the locking ball 510 comes into contact with an upper surface of the earpiece body 110. When a user applies a force to the earpiece 100 that is greater than the elastic force applied to the locking ball 510 by the spring 520, the locking ball 510, being in contact with an upper surface of the earpiece 100, is moved in the fourth direction (4). While the earpiece 100 continues to be drawn-in the earpiece mounting portion 200 in the third direction (3), the locking ball 510 is restored to its original position in an opposite direction to the fourth direction (4) when it reaches the locking recess 180. As a result, the earpiece 100 is releasably secured at the earpiece mounting portion 200 by an elastic force of the spring 520.

When the earpiece 100 is to be separated from the earpiece mounting portion 200, a force is applied to the earpiece 100 in an opposite direction to the third direction (3). As a result, an upper surface of the earpiece 100 applies a force to the locking ball 510 in the fourth direction (4). When the force applied to the locking ball 510, exceeds the elastic fore of the spring, the locking ball 510 is moved in the fourth direction (4). Here, when a contact state between the earpiece 100 and the locking ball 510 is released, the earpiece 100 is separated from the earpiece mounting portion 200.

In the aforementioned embodiment, a slide-type portable terminal was explained. However, the present invention may be applied to a bar-type portable terminal, a folder-type portable terminal, a swivel-type portable terminal, or any other suitable portable terminal.

The present invention has the following effects. First, because the earpiece is detachably mounted at the terminal body with a controllable length, a user's convenience is enhanced. Second, because a mounting space for the earpiece inside the terminal body is minimized, the portable terminal can have a slim configuration. Third, because a built-in battery chargeable by a battery of the portable terminal is mounted at the earpiece, the earpiece requires no additional power source. Fourth, because the earpiece mounting portion is covered by a cover even if the earpiece is separated from the terminal body, an appearance of the terminal body is not degraded. Fifth, because the earpiece is mounted or detached to/from the terminal body with one end thereof being fixed by the earpiece mounting portion, a detachable mounting structure of the earpiece can simplified and stabilized. Sixth, because the earpiece is secured or released by the locking unit as a user applies a rotation force to the earpiece, a user's convenience is enhanced.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
    a terminal body having an earpiece mounting portion;
    an earpiece detachably mounted at the earpiece mounting portion; and
    a locking unit configured to secure and release the earpiece to/from the earpiece mounting portion,
    wherein the locking unit includes:
        a locking recess located in the earpiece body, the locking recess having a hooking protrusion extending from an inner wall of the locking recess; and
        a locking member movably disposed at the earpiece mounting portion, the locking member being moveable from an original position by contacting the hooking protrusion when the earpiece is detachably mounted at the earpiece mounting portion, and restorable to the original position thereby being held by the hooking protrusion, and
    wherein the locking member includes:
        a locking hook securable by the hooking protrusion;
        a button portion extending from one side of the locking hook and pressable by a user to release the locking hook from the locking protrusion; and
        a friction portion formed at one side of the locking member that frictionally contacts the earpiece when the locking member is moved, the friction portion configured to minimize a moving distance of the earpiece when the earpiece is detached from the earpiece mounting portion.

2. The portable terminal of claim 1, wherein the earpiece mounting portion is located at a rear surface of the terminal body.

3. The portable terminal of claim 1, wherein the earpiece mounting portion is recessed from a surface of the terminal body so as to partially mount the earpiece below the surface of the terminal body.

4. The portable terminal of claim 1, wherein the earpiece mounting portion includes:
    a first mounting portion configured to receive the earpiece body; and
    a second mounting portion configured to receive the speaker portion.

5. The portable terminal of claim 1, wherein the speaker portion includes:
    a speaker body having a speaker located therein, the speaker body protruding from one side surface of the earpiece body; and
    a supporting member located on an outer surface of the speaker body to be movable in a length direction of the speaker body and to be insertable into an ear of a user.

6. The portable terminal of claim 5, wherein the supporting member is sized such that the earpiece is supportable in the ear of the user.

7. The portable terminal of claim 5, wherein the speaker portion includes a guide portion connecting the supporting member to the speaker body, the guide portion being configured to guide the supporting member to move in the length direction of the speaker body when the supporting member is rotated about the speaker body.

8. The portable terminal of claim 7, wherein the guide portion includes:
    a guide slot spirally formed on the outer surface of the speaker body; and
    a guide protrusion extending from an inner surface of the supporting member, the guide protrusion being inserted into the guide slot to allow the guide protrusion to be moved along the guide slot.

9. The portable terminal of claim 8, wherein the guide portion includes fixing portions to hold the guide protrusion so as to maintain the supporting member in a drawn-in state and a drawn-out state of the supporting member, respectively.

10. The portable terminal of claim 9, wherein the guide slot includes a first end, a second end, and a spiral portion, and the first and second ends extend in directions different than the spiral portion to provide the fixing portions.

11. The portable terminal of claim 1, wherein the earpiece body includes a microphone configured to input sound.

12. The portable terminal of claim 1, wherein the earpiece body includes a key button configured to input information.

13. The portable terminal of claim 1, wherein the terminal body includes a battery located therein, the earpiece includes a battery located therein, and the battery of the earpiece is chargeable by the battery of the terminal body when the earpiece is detachably mounted at the earpiece mounting portion.

14. The portable terminal of claim 1, wherein the terminal body comprises a cover configured to cover the earpiece mounting portion when the earpiece is detached from the earpiece mounting portion.

15. The portable terminal of claim 14, further comprising an elastic member arranged between the cover and an inner surface of the earpiece mounting portion, the cover being displaceable in the earpiece mounting portion by an elastic force provided by the elastic member.

16. The portable terminal of claim 15, wherein the cover is linearly displaceable in the earpiece mounting portion.

17. The portable terminal of claim 15, wherein the elastic member is a conical coil spring.

18. The portable terminal of claim 1, wherein the earpiece is rotatable about one end secured by the earpiece mounting portion to allow the earpiece to be mounted at and detached from the terminal body.

19. The portable terminal of claim 18, wherein the earpiece mounting portion includes an earpiece fixing recess located at a lower end thereof to releasably secure the one end of the earpiece, and the earpiece includes a fixing portion at a lower end thereof to be releasably secured by the earpiece fixing recess.

20. The portable terminal of claim 1, wherein the locking hook has an inclined surface configured to displace the locking hook when contacted with the hooking protrusion and thereby unlocking from the hooking protrusion when a force is applied in a direction that the earpiece is detached from the earpiece mounting portion.

21. The portable terminal of claim 1, wherein the locking unit includes an elastic member configured to provide an elastic force to the locking member in a direction that the locking member is held by the hooking protrusion.

22. The portable terminal of claim 1, wherein the friction portion is formed at one side of the locking member in a form of a protrusion protruding in a direction that the button portion is pressed.

23. The portable terminal of claim 1, wherein the earpiece includes:
  an earpiece body configured to communicate with the terminal body; and
  a speaker portion configured to output sound transmitted from the earpiece body, the speaker portion having a controllable length so as to reduce a thickness of the earpiece when the earpiece is detachably mounted at the earpiece mounting portion.

24. The portable terminal of claim 23, wherein the earpiece further comprises a release recess formed at an upper end of the earpiece body, the release recess being configured to apply a force to detach the earpiece from the earpiece mounting portion.

25. The portable terminal of claim 23, wherein the friction portion is configured to frictionally contact the speaker portion when the locking member is moved.

26. A portable terminal, comprising:
  a terminal body having an earpiece mounting portion;
  an earpiece detachably mounted at the earpiece mounting portion; and
  a locking unit configured to secure and release the earpiece to/from the earpiece mounting portion,
  wherein the earpiece includes:
    an earpiece body configured to communicate with the terminal body; and
    a speaker portion configured to output sound transmitted from the earpiece body, the speaker portion having a controllable length so as to reduce a thickness of the earpiece when the earpiece is detachably mounted at the earpiece mounting portion,
  wherein the locking unit includes:
    a locking recess located in the earpiece body, the locking recess having a hooking protrusion extending from an inner wall of the locking recess;
    a locking member movably disposed at the earpiece mounting portion, the locking member being moveable from an original position by contacting the hooking protrusion when the earpiece is detachably mounted at the earpiece mounting portion, and restorable to the original position thereby being held by the hooking protrusion; and
    an elastic member configured to provide an elastic force to the locking member in a direction that the locking member is held by the hooking protrusion, and
  wherein the locking member includes:
    a locking hook securable by the hooking protrusion;
    a button portion extending from one side of the locking hook and pressable by a user to release the locking hook from the locking protrusion; and
    a friction portion formed at one side of the locking member that frictionally contacts the earpiece when the button portion is pressed so as to minimize a moving distance of the earpiece when the earpiece is detached from the earpiece mounting portion.

* * * * *